Oct. 16, 1923.
W. C. TYLER
1,470,947
POWER TRANSMISSION MECHANISM
Filed Oct. 29, 1920
3 Sheets-Sheet 2
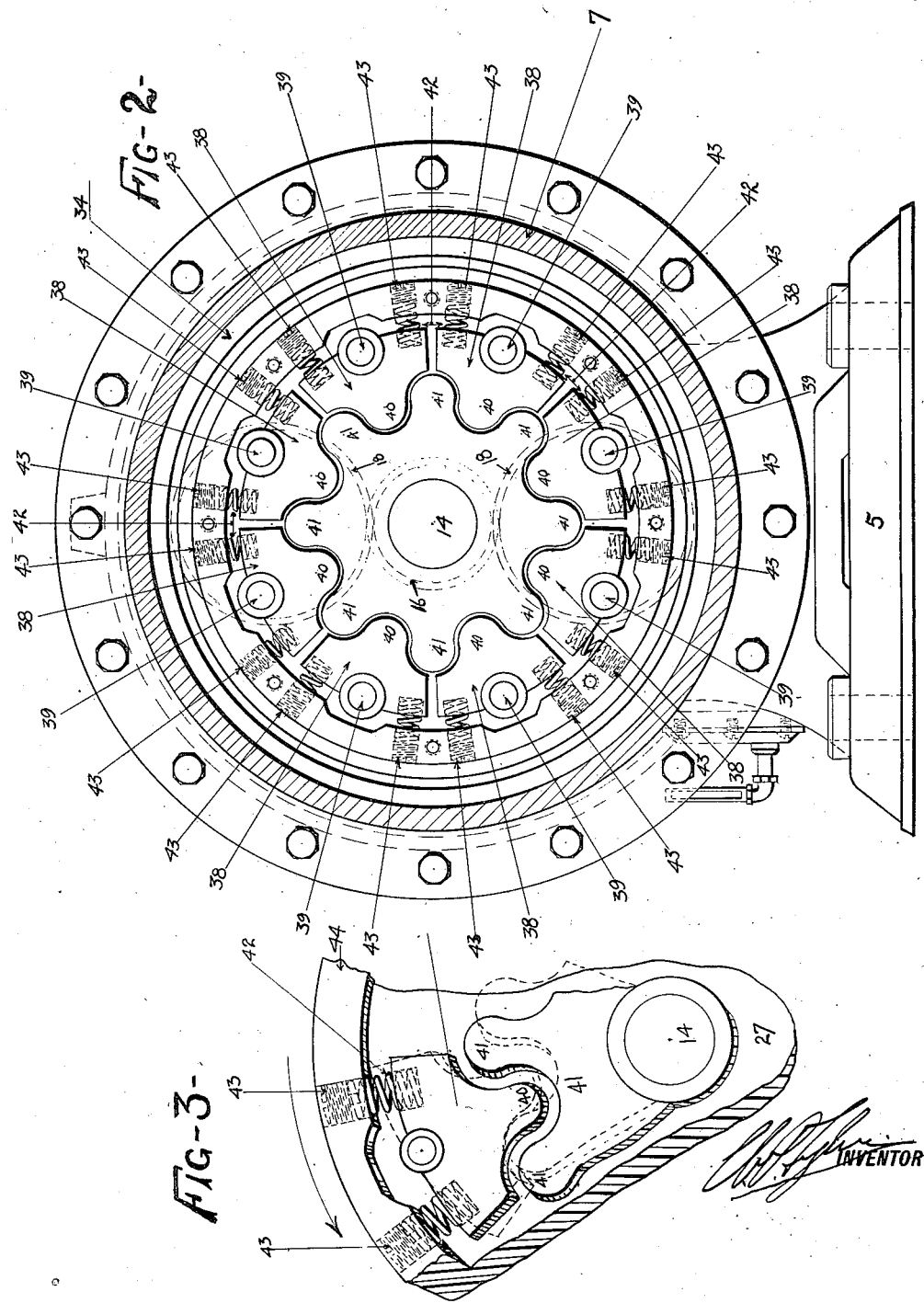

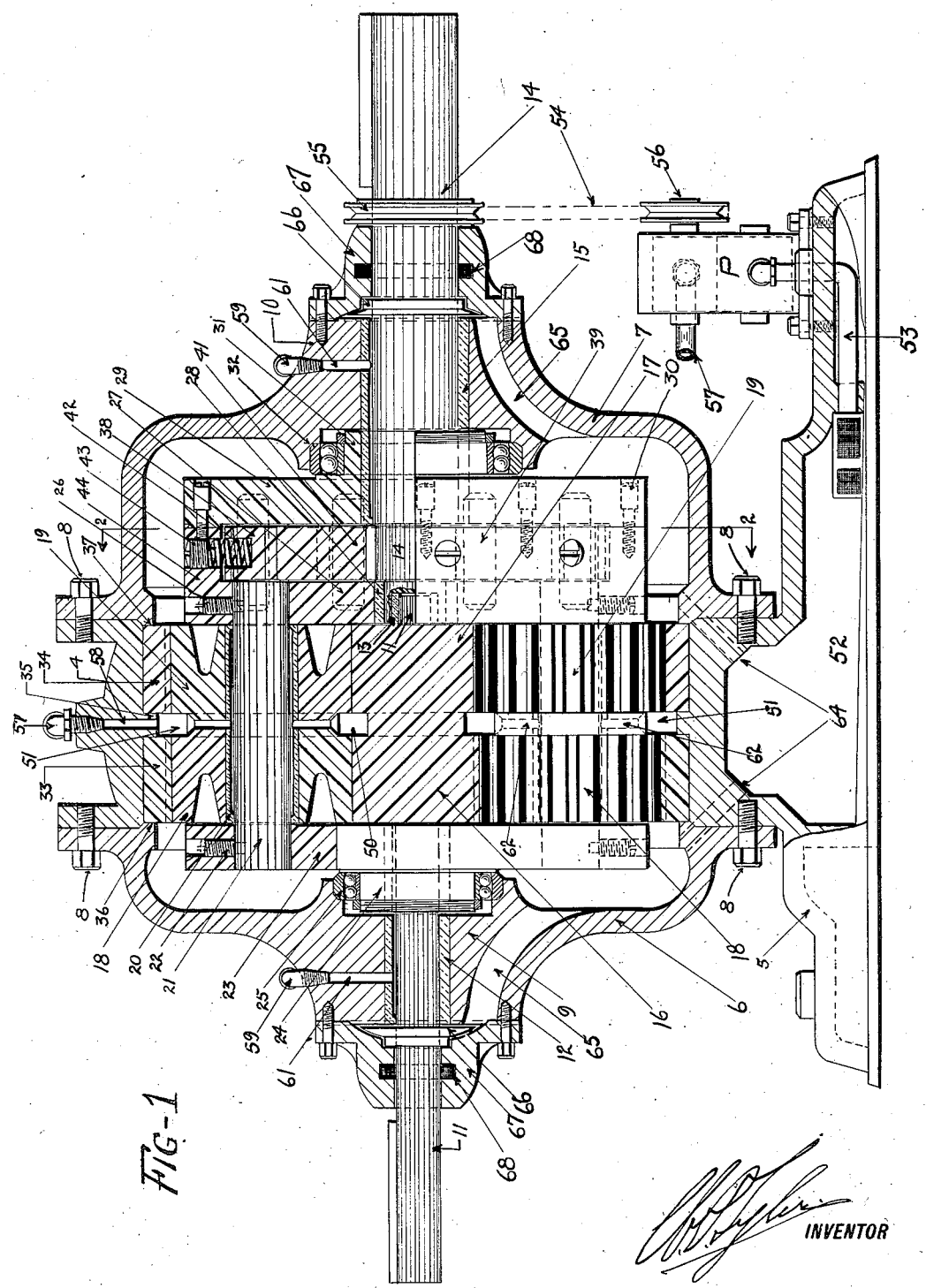

Oct. 16, 1923.
W. C. TYLER
POWER TRANSMISSION MECHANISM
Filed Oct. 29, 1920
1,470,947
3 Sheets-Sheet 3
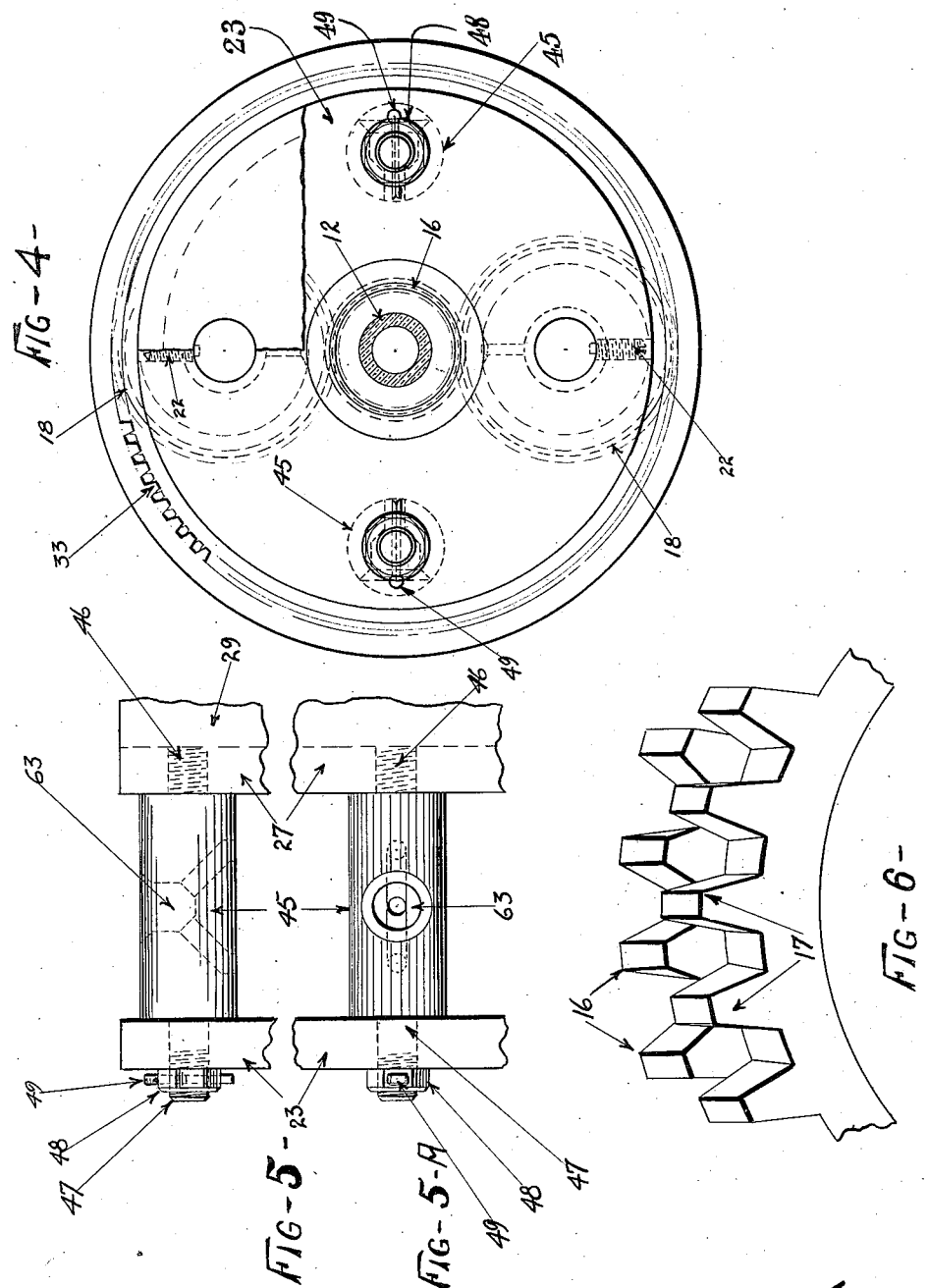

Patented Oct. 16, 1923.

1,470,947

UNITED STATES PATENT OFFICE.

WARREN C. TYLER, OF EAST ORANGE, NEW JERSEY, ASSIGNOR TO BENNINGTON SCALE MFG. CO., INC., OF BENNINGTON, VERMONT, A CORPORATION OF VERMONT.

POWER-TRANSMISSION MECHANISM.

Application filed October 29, 1920. Serial No. 420,337.

*To all whom it may concern:*

Be it known that I, WARREN C. TYLER, a citizen of the United States, and a resident of East Orange, in the county of Essex and State of New Jersey, have invented certain new and useful Improvements in Power-Transmission Mechanism, of which the following is a specification.

This invention relates to power transmission mechanism of the planetary gear type in which the movement of a driving element is transmitted to a co-axially driven element at a different speed and particularly adapted for the coupling of an electric motor to a driven machine to drive the latter at a reduced speed, and it an object of the invention to provide a flexible coupling between the driving and driven elements arranged and constructed to absorb shocks and eliminate vibration and chattering in the transmission mechanism due to a load being applied to the driven shaft, as by a machine driven thereby, and also serve to hold the faces of the teeth of the gearing together and eliminate any possibility of backlash.

It is a further object of the invention to provide a power transmission mechanism of this character in which the flexible coupling or connection between the driving and driven elements is built into the reducing gearing.

It is another object of the invention to provide a transmission mechanism of this character in which the gearing is constructed and arranged in multiple sets of gear teeth with the teeth of one set staggered with relation to the teeth of another set, whereby to increase the number of teeth of the gearing in contact without increasing the arc of action and thereby increasing the efficiency and smooth operation.

Another object of the invention is to provide in power transmission mechanism of this character improved lubricating means for the operative parts of the mechanism.

In the drawings accompanying and forming a part of this specification Figure 1 is a side elevation showing an enclosing casing for the gearing in section with the upper portion of the gearing in section and the lower portion thereof in elevation.

Figure 2 is a cross sectional view taken substantially on the line 2—2 of Figure 1 looking in the direction of the arrows.

Figure 3 is an enlarged view in perspective of a portion of the flexible coupling between the driving and driven elements, and showing in a diagrammatic manner the action of the coupling in operatively connecting the driving and driven elements.

Figure 4 is an end elevation of the carrier for the planetary gears and showing the relation of the gearing.

Figures 5 and 5$^a$ are enlarged detail views in side elevation and plan, respectively, of means to connect the parts of the carrier in spaced relation; and Figure 6 is an enlarged fragmentary view in perspective to show the staggered relation of the gear teeth arranged upon the driving element.

Similar characters of reference designate like parts throughout the different views of the drawings.

In the embodiment of my invention shown in the drawings the operative mechanism is mounted and enclosed in a casing comprising an annular member 4 rising up from and which may be integral with a base 5. A pair of end sections 6 and 7 are axially secured to the opposite ends of the annular member 4 by bolts 8 to provide an enclosing housing for the operative mechanism, each of which sections has a bearing 9, 10 arranged co-axially of each other and the annular member 4.

A driving element or high speed shaft 11 is journaled at one end by a bushing 12 in the bearing 9 of casing section 6 and the opposite end has a bearing 13 in the end of the driven element or slow speed shaft 14 journaled by a bushing 15 in the bearing 10 of the casing section 7. The shaft 11 is provided with gear teeth 16, 17, which are preferably of the spur gear type and may be cut integral with the shaft or upon the periphery of wheels and fixed upon the shaft. These teeth are preferably arranged in staggered relation with the teeth 16 cut in advance of the teeth 17, or the teeth 16 to come opposite the tooth spaces between the teeth 17. By this method the number of teeth in contact is increased without increasing the arc of action thereby increasing the efficiency and giving a smoother action in operation. Planetary gears 18, 19 having multiple sets of teeth arranged in staggered relation to correspond with the teeth of the gears 16, 17 mesh with said latter teeth and are supported to revolve on said teeth 16, 17 and to rotate on their own axes. Two sets of such gears are shown although three sets may be utilized equi-distantly spaced about the driving shaft. The planetary gears are loosely mounted by bushings 20 on studs 21 fixed at one end by dowels 22 in a head or disk 23 having an axial opening for the passage of the driving shaft and the bushing 12 and having a hub portion 24 mounted to rotate in a bearing 25 of the ball type in the casing section 6 concentric with the driving shaft. The opposite ends of the studs are fixed by dowels 26 in a disk 27 in which the slow speed shaft 14 is supported by a bushing 28. The disk 27 has an annular projection 44 at the periphery extending parallel with the axis of the disk, a second disk 29 being fixed to said annular projection 44 by screws 30 to form an integral structure with said disk 27. The driven shaft 14 and its bushing 15 pass through and may be supported in the disk 29, the latter having a hub portion 31 whereby it is rotatably mounted and supported with disk 27 in a bearing 32 of the ball type in the casing section 7 concentric with the shaft 14. By the arrangement of the mounting of the planetary gear carrying heads 22 and 27, 29 said gears are supported in the casing independent of the shafts to rotate freely about the gears or teeth 16, 17 on the driving shaft.

The planetary gears 18, 19 mesh with correspondingly formed teeth on the inner surface of rings 33, 34 which are in the nature of annular racks fixed in the casing between an annular rib 35 and annular shoulders 36, 37 arranged at the connection of the end sections 6, 7 with the annular member 4.

By the staggered arrangement of the teeth 16, 17 and of the planetary gears 18, 19 and annular gears 33, 34 the number of teeth which are in contact is increased as compared with ordinary spur gear teeth and without increasing the arc of action whereby the operating efficiency of the gear teeth is augmented, and also serves to hold the faces of the teeth together without any possibility of backlash. To facilitate the cutting of the teeth 16, 17 on the shaft 11 an annular recess 50 is provided and to cut the teeth on the planetary pinion 18 an annular recess 51 is arranged substantially equidistantly between the ends of the pinions.

The head disks 23, 27 are secured together in fixed spaced relation by spacers 45 having a reduced threaded end 46 threaded into the disk 27 and a reduced portion 47 at the opposite end to engage openings in the disk 23 (Figures 5 and 5ª) with a nut 38 threaded on such reduced portion, the nuts being locked thereon by cotter pins 49 passing through openings in the nuts and reduced ends 47, the disk being maintained in spaced relation by engaging the shoulders formed by the reduced ends 46, 47. These spacers 45 are located in alternate relation to the planetary gears 18.

To couple the driving shaft 11 with the driven shaft 14, a series of circumferentially disposed rockers 38, shown as eight in number, are pivotally supported upon pins 39 mounted at opposite ends in openings in the head disks 27, 29 to engage in the space between said head disks, said rockers being in the nature of sectors having a projection or tooth 40 extending radially inward to engage in a space between arms of a spider 41 fixed on the driven shaft 14 as by shrinking thereon with a space on clearance betweeen the teeth of the rockers and the arms of the spider in the normal inoperative position of the transmission mechanism and maintained in equilibrium by springs 42 seated at one end in openings in the rockers at opposite sides of the supporting pins 39 and in openings in the annular flange 44 of the disk 27 and retained therein by threaded abutments 43.

In operation assuming that power is being applied to the driving shaft to rotate said shaft and the driven shaft in the direction indicated by the arrow in Figure 3, as the planetary gears revolve with their supports about the teeth or gears 16, 17 and the annular racks the rockers will have a slight lost motion until the rocker teeth engage with the arms of the spider thereby rocking the rocker on their supports, as shown by dotted lines in Figure 3 until the springs at the right of the pivotal support of the rockers, as viewed from Figure 2, are compressed to their maximum, when said rockers will revolve or turn the spider and thereby the driven shaft 14 therewith.

On the power being applied to rotate the driving shaft in reverse direction the action of the rockers in coupling the planetary gears and thereby the driven shaft with the spider in reverse direction the springs at the left of the pivotal support of the rockers will be compressed as viewed from Figure 2. By the arrangement of the mounting of the rockers a flexible and yielding coupling is provided between the driving and driven shafts and any shocks which would ordinarily be transmitted to the driving shaft as it is coupled to the driven shaft are absorbed by the springs 43, and these springs also absorbing and eliminating any vibration or chatter which may be caused by the load connected to the driven shaft, such as a machine; these springs also serve to hold the teeth of the planetary gears in mesh with the teeth of the annular racks and on the driving shaft and thereby eliminating any possibility of backlash.

To provide the operative members with lubricant a lubricant containing well 52 is arranged in the base 5 from which the lubricant is fed or delivered by a suitable pump, shown in a general way at P as of the rotary type, having an inlet connection 53 with the well 52, said pump being driven from the driven shaft 14 by a cable or belt 54 passing around a pulley 55 on the shaft 14 and a pulley 56 rotatable with the pumping element of the pump. The pump outlet is connected by a pipe 57 with a port 58 at the top of the annular member 4 of the casing; and branch conduits 59 connected to a port 60 leading to the bearing of shaft 11 in bushing 12 and a port 61 leading to the bearing of shaft 14 in bushing 15. The lubricant fed through the port 58 flows on to the planetary gears and the annular recess 51 therein, and from said recess through ports 62 to the bearing of the planetary gears in bushings 20 on the studs 21, and also through a port or opening 63 in the spacing studs 45 and drips into the bottom of the casing flowing from the latter through port 64 into the well 52. The lubricant is directed from the bearings of the shafts 11, 14 through ports 65 into the base of the casing by deflectors 66 mounted on the shafts at the outer sides of the bearing for the shafts in the casing sections 6 and 7, and retained in position by perforated caps 67 bolted to the ends of said casing sections, said caps being provided with stuffing boxes 68 to prevent leakage of the lubricant. As a further means of lubrication when the gearing is assembled lubricant, such as grease, is placed in the space between the disks 27, 29, said disks with the disk flange 44 constituting a closed housing retaining the lubricant therein and in which the coupling for the driving and driven shafts is located.

Having thus described my invention I claim—

1. In power transmission mechanism, the combination of a casing, driving and driven shafts independently journalled in said casing; planetary gearing supported in the casing independently of the driving and driven shafts operated from the driving shaft; and a flexible coupling between the planetary gearing and driven shaft for the purpose specified.

2. In power transmission mechanism, the combination of a casing, driving and driven shafts coaxially journalled in the casing; a gear on the driving shaft; planetary gearing to mesh with the gear on the driving shaft revolubly supported in the casing independently of the driving and driven shafts; and means to couple the planetary gearing to the driven shaft for the purpose specified.

3. In power transmission mechanism, the combination of a casing; driving and driven shafts co-axially journalled in said casing; a gear on the driving shaft; an annular gear fixed in the casing concentric with the gear on the driving shaft; planetary gearing meshing with said gear on the driving shaft and the annular gear; a carrier for said planetary gearing journaled in bearings in the casing through which the driving and driven shafts pass; and means to couple the planetary gearing to the driven shaft through the carrier therefor.

4. In power transmission mechanism, the combination of a casing; driving and driven shafts co-axially journaled in the casing; a gear on the driving shaft; planetary gears meshing with said gear on the driving shaft; heads carrying said planetary gears having bearings in opposite ends of the casing concentric with the shafts and through which bearings and the heads the driving and driven shafts pass; and means to couple one of said heads with the driven shaft for the purpose specified.

5. In power transmission mechanism, the combination of a casing; driving and driven shafts co-axially journaled in the casing; a gear on the driving shaft; planetary gears meshing with said gear on the driving shaft; a head having a bearing in the casing concentric with the driving shaft and through which head and bearing said shaft passes; studs fixed in said head upon which the planetary gears are rotatably mounted; a head in which the opposite ends of the studs are fixed having a bearing in the casing concentric with the driven shaft and through which head and the bearing said shaft passes; and means carried by said latter head and the driven shaft to couple the latter shaft with the planetary gears and thereby with the driving shaft.

6. In power transmission mechanism, the combination of a casing; driving and driven shafts journaled co-axially in the casing; a gear on the driving shaft; an annular gear fixed in the casing concentric with the gear on the driving shaft; planetary gears meshing with said gear on the driving shaft and the annular gear; a head having a bearing in the casing concentric with the driving shaft and through which head and bearing said shaft passes; studs fixed in said head upon which the planetary gears are rotatably mounted; a second head in which the opposite ends of the studs are fixed having a bearing in the casing concentric with the driven shaft and through which head and bearing said shaft passes; a toothed sector carried by said latter head; and a spider fixed to the driven shaft with which the tooth of the sector cooperates to couple the planetary gears with the driven shaft for the purpose specified.

7. In power transmission mechanism, the combination of a casing; driving and driven shafts co-axially journaled in the casing; a gear on the driving shaft; planetary gears to mesh with said gear; means to carry said planetary gears comprising a pair of heads having bearings in the casing concentric with and independent of the driving and driven shafts; and means to couple the planetary gears and thereby the driving shaft with the driven shaft.

8. In power transmission mechanism, the combination of a casing; driving and driven shafts journaled co-axially in the casing; an annular rack concentric with the shafts; a gear on one of said shafts; planetary gears to mesh with the rack and gear revolubly supported in the casing independent of the shafts; and a flexible coupling between said planetary gears and the other of said shafts for the purpose specified.

9. In power transmission mechanism, the combination of a casing; driving and driven shafts journaled co-axially in the casing; a gear on one of said shafts; a fixed annular rack; planetary gears meshing with said rack and gear; a support for said planetary gears having bearings in the casing concentric with and independent of the shafts; circumferentially disposed rockers carried by said support; and a spider fixed to the other shaft with which said rockers co-operate to couple the driving and driven shafts.

10. In power transmission mechanism, the combination of a casing; driving and driven shafts co-axially journaled in the casing; a gear fixed to the driving shaft; an annular rack fixed in the casing; planetary gears meshing with said rack and gear; a support for the planetary gears having bearings in the casing concentric with but independent of the shafts; circumferentially disposed rockers pivotally carried by said support; equalizing springs co-operating with said rockers; and a spider fixed with the driven shaft with which the rockers co-operate to flexibly couple the driving and driven shafts.

11. In a power transmission mechanism, the combination of a casing; driving and driven shafts co-axially journaled in the casing; a gear fixed to the driving shaft; an annular rack fixed in the casing; planetary gears meshing with said rack and gear; a head having a bearing in the casing concentric with and independent of the driving shaft; studs fixed at one end in said head upon which the planetary gears are rotatably mounted; a second head having a bearing in the casing concentric with and independent of the driven shaft; a disk in which the opposite ends of the planetary gear carrying studs are fixed having an annular flange and connected by the flanged portion with the head concentric with the driven shaft; circumferentially disposed rockers pivotally carried by said latter head; springs seated in recessed portions of the annular flange of the disk and in the rockers at opposite sides of the pivotal support thereof; and a spider fixed to the driven shaft with which said rockers co-operate to couple the driving and driven shafts.

12. In power transmission mechanism, the combination of a casing; a pair of shafts coaxially journaled in said casing; multiple sets of gear teeth arranged concentrically on one of said shafts; a pair of annular internal gears fixed in the casing; planetary gears having multiple sets of teeth revolubly supported in the casing independent and concentric of the shafts to revolve about the gear teeth and the internal gear and rotate about their own axes, the teeth of one set of the respective gears being staggered with relation to another set of teeth; and means to couple the planetary gears to the driven shaft for the purpose specified.

13. In power transmission mechanism, the combination of a casing; driving and driven shafts coaxially journaled in the casing; a plurality of sets of gear teeth staggered with relation to the teeth of another set; planetary gears supported in the casing independently of the shafts to revolve about the gear teeth on the driving shaft and rotate about their own axes, said gears having a plurality of sets of teeth with the teeth of one set staggered with relation to the teeth of another set and mesh with the teeth on the driving shaft; a plurality of annular gears fixed in the casing with the teeth of the one gear staggered with relation to the teeth of another of said gears and with the teeth of which gears the planetary gears mesh; and means to couple the planetary gears to the driven shaft for the purpose specified.

14. In power transmission mechanism, the combination of a casing comprising an annular section and end sections secured to opposite ends thereof; an annular internal gear fixed in the annular section; driving and driven shafts co-axially journaled in the end sections of the casing; a gear on the driving shaft; planetary gearing in mesh with said gear on the driving shaft and internal gear revolubly supported in the end sections of the casing independent of the driving and driven shafts; and means between the planetary gearing and driven shaft to couple the latter to the driving shaft.

15. In power transmission mechanism, the combination of a casing comprising an annular section and end sections secured to opposite ends thereof; an annular internal gear fixed in the annular section; driving and driven shafts co-axially journaled in the end sections of the casing; a gear on the driving shaft; planetary gearing meshing with said gear on the driving shaft and internal gear; means to support said planetary gearing in the end sections of the casing independent of the driving and driven shafts to revolve about the gear on the driving shaft and rotate on their own axes; rockers revoluble with the planetary gearing; and a spider fixed to the driven shaft with which the rockers co-operate to couple the driving and driven shafts together.

Signed at New York city, in the county of New York and State of New York, this 25th day of October, 1920.

WARREN C. TYLER.